United States Patent [19]

Leininger et al.

[11] Patent Number: 4,541,416
[45] Date of Patent: Sep. 17, 1985

[54] SOLAR ENERGY COLLECTION SYSTEM

[76] Inventors: Robert W. Leininger, 202 Willow Dr.; Richard G. Decker, 103 Baybridge Rd., both of North Cape May, N.J. 08204

[21] Appl. No.: 437,664

[22] Filed: Oct. 29, 1982

[51] Int. Cl.⁴ .............................................. F24J 3/02
[52] U.S. Cl. .................................. 126/450; 126/424; 126/432; 126/438
[58] Field of Search ............... 126/417, 424, 432, 438, 126/443, 450

[56] References Cited

U.S. PATENT DOCUMENTS

| | | | |
|---|---|---|---|
| 3,996,918 | 12/1976 | Quick | 126/432 |
| 4,130,106 | 12/1978 | Clevett et al. | 126/438 X |
| 4,136,669 | 1/1979 | Lane | 126/450 |
| 4,149,525 | 4/1979 | Prado | 126/450 |
| 4,184,481 | 1/1980 | Tornquist | 126/450 X |
| 4,187,832 | 2/1980 | Tregoning | 126/443 |
| 4,284,061 | 8/1981 | Wildenrotter | 126/438 X |
| 4,296,739 | 10/1981 | Bolding | 126/450 X |
| 4,329,978 | 5/1982 | Wormser et al. | 126/424 X |
| 4,371,623 | 2/1983 | Taylor | 126/438 X |
| 4,398,053 | 8/1983 | Orillion | 126/450 X |
| 4,401,106 | 8/1983 | Binner | 126/450 |

FOREIGN PATENT DOCUMENTS 2614545  8/1977  Fed. Rep. of Germany ...... 126/438
2044914 10/1980  United Kingdom ............ 126/438

Primary Examiner—Margaret A. Focarino
Assistant Examiner—Kenichi Okuno
Attorney, Agent, or Firm—Benasutti and Murray

[57] ABSTRACT

A pyramid-shaped solar collector is provided which is capable of operation in conjunction with heat transfer media such as air, water and oil. A pre-heater assembly is provided for use in conjunction with the solar collector to develop improved thermal output capabilities. Series of mirrors are provided for use in conjunction with the solar collector and pre-heater to provide further improvements, a first series of mirrors primarily serving to amplify the quantity of incident solar radiation delivered to the solar collector and pre-heater, and a second series of mirrors primarily serving to compensate for movement of the sun with respect to the solar collector and pre-heater throughout the day.

3 Claims, 10 Drawing Figures

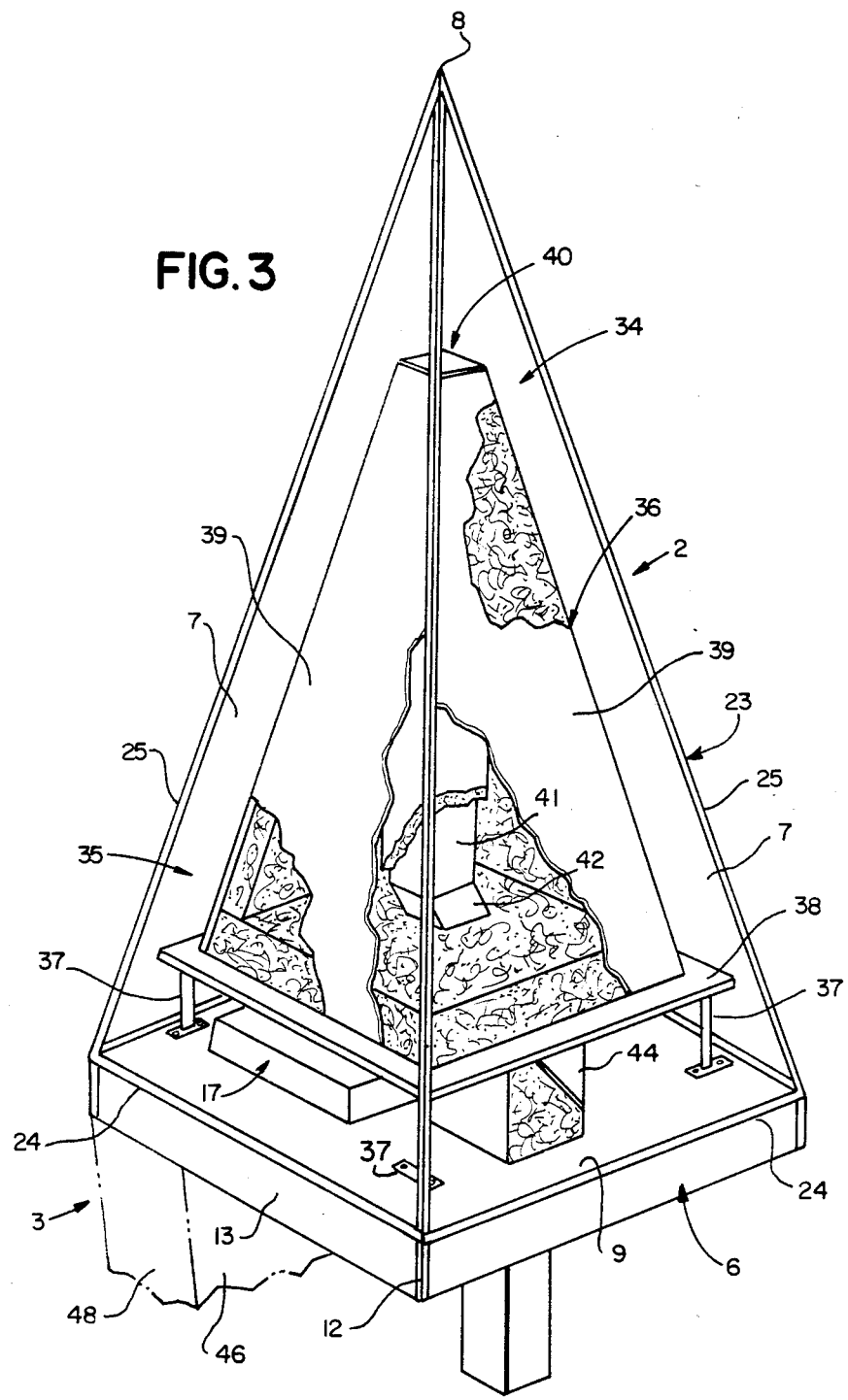

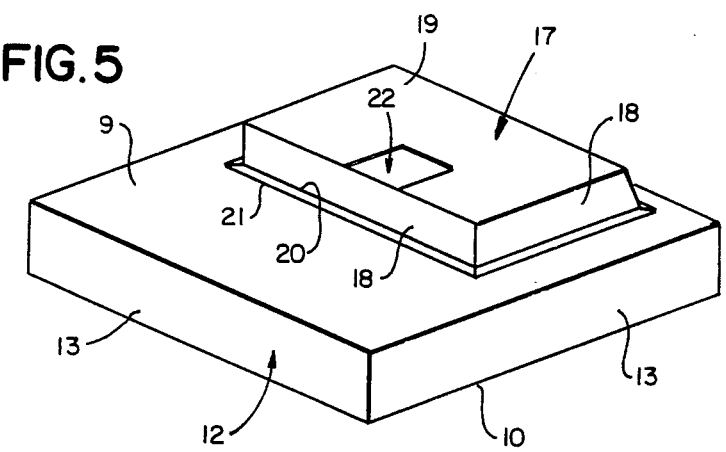
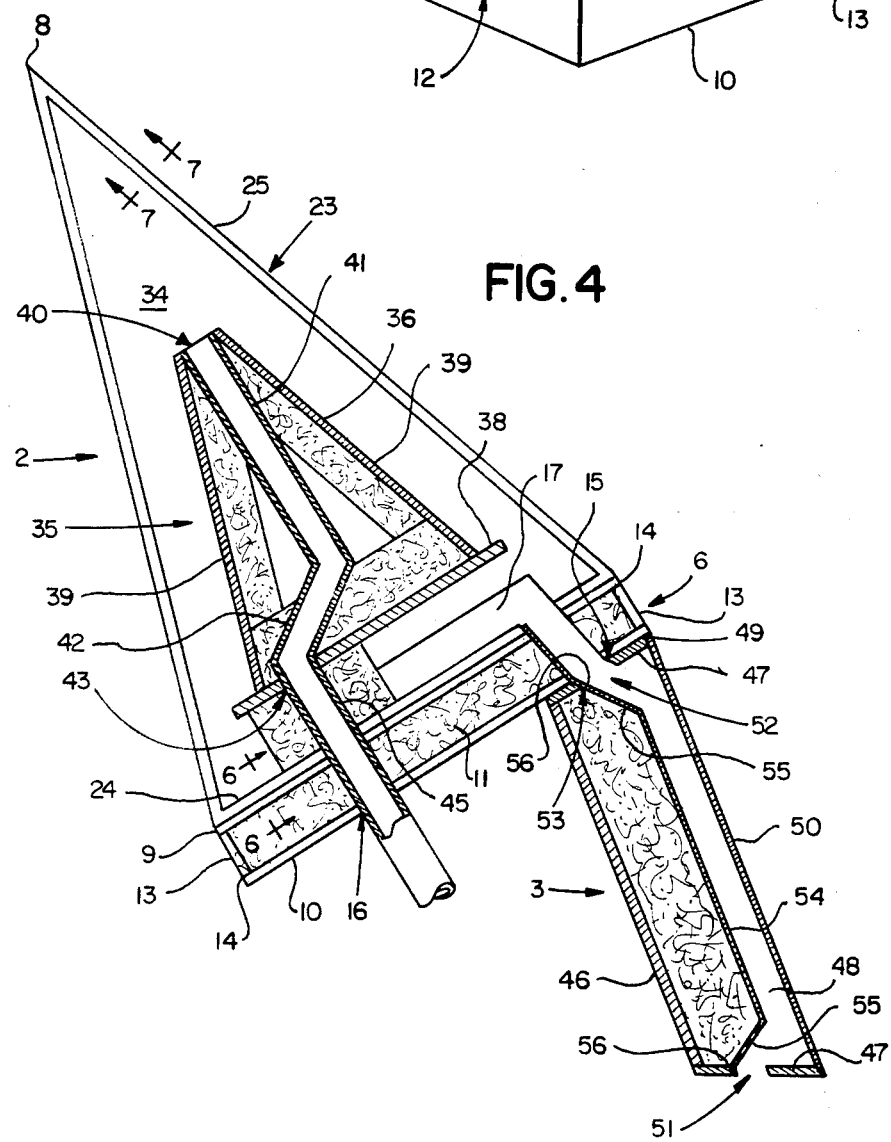

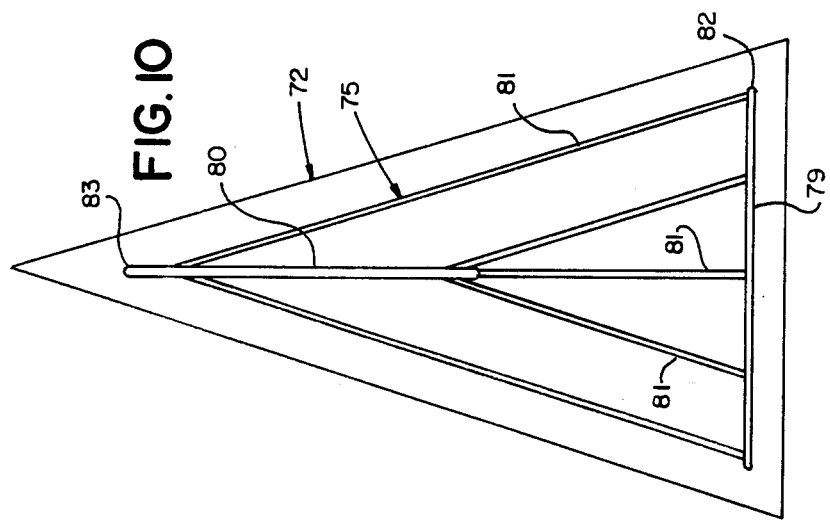
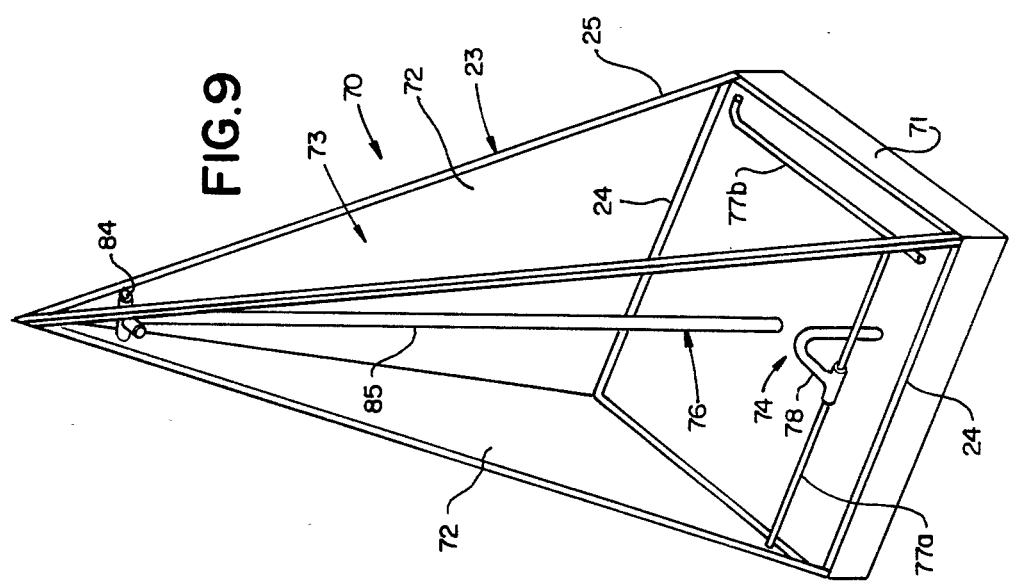

SOLAR ENERGY COLLECTION SYSTEM

BACKGROUND OF THE INVENTION

The present invention relates generally to the field of solar energy collection systems, and more particularly, to a solar energy collection system of improved efficiency and capacity.

A variety of collector systems have been developed for collecting solar energy and converting such collected solar energy into heat for use with various types of heating systems. Many of the collector systems which have been developed incorporate flat plate type solar collector panels which are placed on or adjacent a structure to be heated in an appropriate orientation for receiving solar radiation. Generally, such collector panels are placed on the roof of the structure to increase the period of time during which such collector panels will be exposed to solar radiation. However, irrespective to the flat plate type collector panel used, such systems have generally not found public acceptance.

One reason for this is that in order to achieve significant temperatures and obtain sufficient heating capabilities, the flat plate type collector panels which have been developed to date must often be inordinately large, often covering significant portions of the structure being heated. This presents a variety of problems. For example, a significant amount of space must be provided to house such components. Further, since such components are generally relatively heavy, the supporting structure must often be strengthened in some way to accommodate the excess weight of the components involved. These factors can compromise the appearance of the resulting structure, presenting yet another disadvantage. Cleraly, these factors each also contribute to increased costs, further compromising the utility of such devices.

In an effort to overcome these disadvantages, other types of collector systems have been developed which attempt to eliminate the need for large flat panels of the type previously described. However, it has been found that many of these collectors tend to compromise the efficiency of the resulting system, often unacceptably so. Further, although such collectors are often reduced in size from the flat plate type collector panels previously described, such structures are generally comprised of a combination of dissimilar structural elements which are often costly and complex. This often leads to many of the disadvantages previously described in conjunction with flat plate type collector panels.

Moreover, irrespective of the collector which is selected for use, it has generally been found that available solar collectors only remain efficient in operation during a relatively short period of time during the day. The primary reason for this is that such solar collectors are affixed to a structure and are therefore stationary with respect to movement of the sun throughout a daylight period. Accordingly, particularly during the morning and afternoon hours, solar radiation received by the collector is not properly coincident with the structure which comprises the collector, resulting in a corresponding reduction in collector efficiency. Movement of the collector with respect to its supporting structure to compensate for this is generally impracticable in view of the moving parts generally required to perform such a function.

It therefore remains desirable to develop a solar energy collection system which incorporates an efficient solar collector of reduced size and weight, and which is capable of compensating for movement of the sun throughout material portions of a daylight period.

SUMMARY OF THE INVENTION

In accordance with the present invention, a solar energy collection system is provided which generally comprises a pyramid-shaped solar collector and series of mirrors which are selectively positioned to receive incident solar radiation and to reflect such received radiation toward the solar collector, thereby providing a solar energy collection system of improved efficiency. The mirrors are further placed with respect to the solar collector in a manner which compensates for movement of the sun throughout a daylight period.

The pyramid-shaped collector includes a pre-heater and collector unit which is capable of transferring collected solar radiation, in the form of heat, to either an air or fluid medium circulated through the collector. A first series of mirrors, preferably placed along lower portions of the solar energy collection system, is primarily provided for use in amplifying the amount of solar radiation which is received and delivered to the collector. A second series of mirrors, which is preferably placed over the first series of mirrors, is primarily provided for use in receiving solar radiation during different portions of a daylight period, for delivery to the collector. In this manner, incident solar radiation is effectively received, reflected and/or amplified and collected by the pyramid-shaped solar collector, essentially irrespective of the position of the sun with respect to the solar energy collection system during its useful duty cycle.

It is therefore a primary object of the present invention to develop a solar energy collection system of improved efficiency and capacity.

It is also an object of the present invention to develop a solar energy collection system which includes a solar collector of improved efficiency and capacity per unit size.

It is also an object of the present invention to develop a solar energy collection system which includes a series of mirrors for receiving and amplifying incident solar radiation for subsequent collection by a solar collector.

It is also an object of the present invention to develop a solar energy collection system which compensates for movement of the sun throughout a given daylight period, without requiring the use of moving parts.

It is also an object of the present invention to develop a solar energy collection which includes a series of mirrors for receiving incident solar radiation and directing such incident solar radiation to a solar collector for subsequent collection and distribution throughout a given daylight period.

It is also an object of the present invention to develop a solar energy collection system which provides the forgoing advantages, but which is relatively simple, lightweight and inexpensive to construct.

These and other objects will become apparent from the following detailed description, taken in conjunction with the following illustrations.

BRIEF DESCRIPTION OF THE DRAWINGS

FIG. 3 is a rear, isometric view of the solar collector illustrated in FIG. 2, portions which have been broken away to show internal construction detail.

FIG. 4 is a cross sectional view of the solar collector and pre-heater illustrated in FIG. 2, taken along line 4—4.

FIG. 5 is an isometric view of the base of the solar collector illustrated in FIG. 2.

FIG. 9 is an isometric view of an alternative embodiment solar collector, incorporating a fluid-type heat transfer medium, portions of which have been removed to show internal construction detail.

FIG. 10 is a top plan view of one side of the solar collector of FIG. 9.

In the several views provided, like reference numerals denote similar structure.

DETAILED DESCRIPTION OF THE PREFERRED EMBODIMENT

Figure 1:
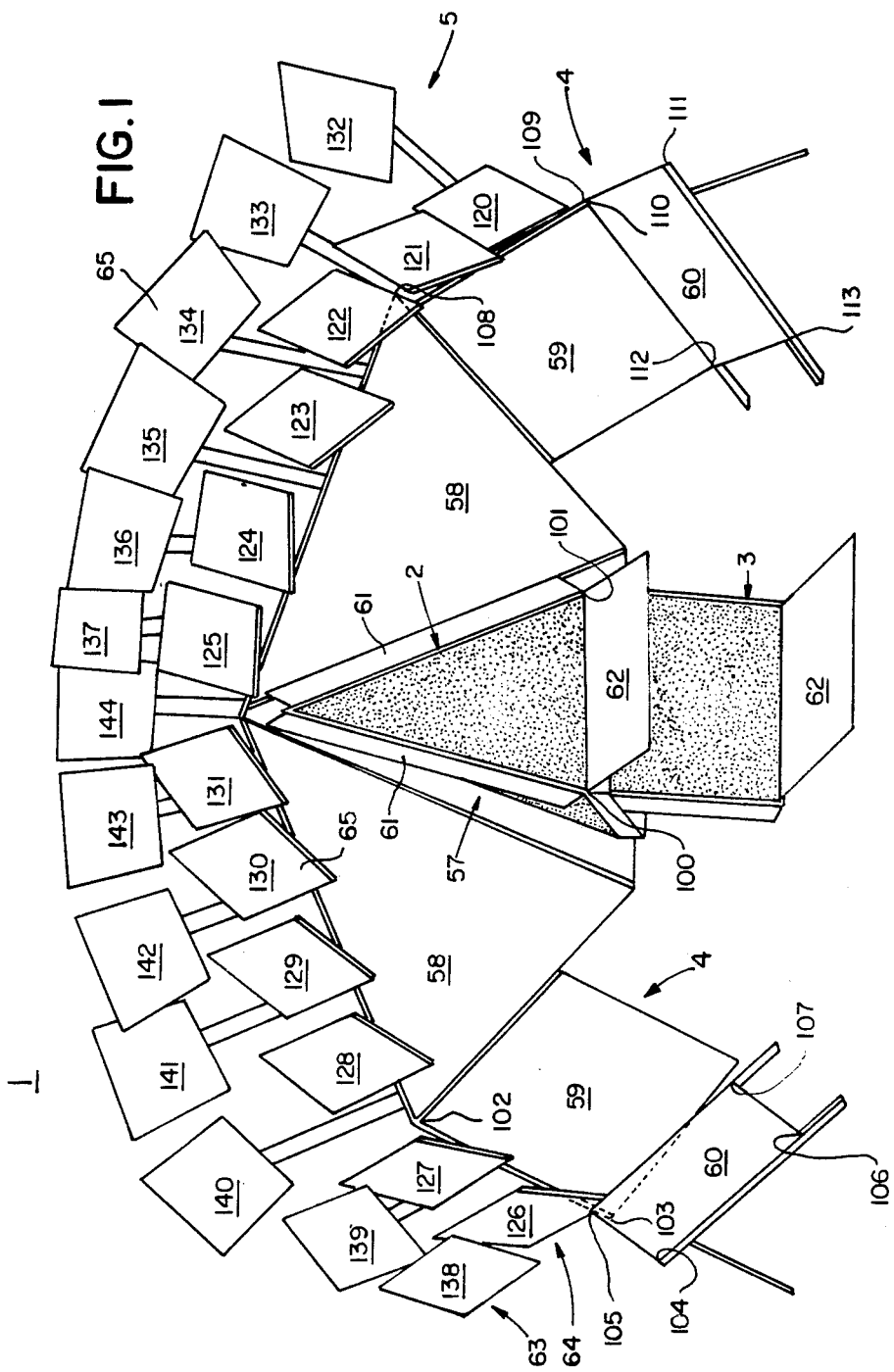
FIG. 1 is a perspective view of a preferred embodiment solar energy collection system produced in accordance with the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates a preferred embodiment solar energy collection system 1 which generally comprises a solar collector 2 and pre-heater 3; a first series of mirrors 4 located behind the solar collector 2 and pre-heater 3 and forming a lower portion of the solar energy collection system 1; and a second series of mirrors 5 located behind the solar collector 2 and pre-heater 3 and forming upper portions of the solar energy collection system 1.

Figure 2:
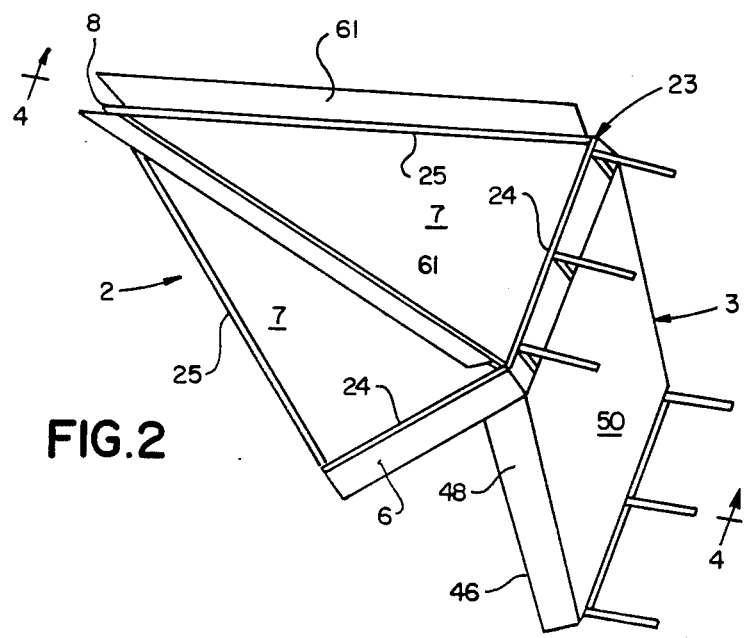
FIG. 2 is a perspective view of the solar collector and pre-heater which form part of the solar energy collection system of FIG. 1.

FIGS. 2-4 illustrate the solar collector 2 and pre-heater 3 in greater detail. It will be noted that the solar collector 2 is generally pyramid-shaped, having a square base 6 and four triangular sides 7 which converge at a pinnacle 8. It will be understood that the size of the various components comprising the solar collector 2 will be varied to suit a particular application and to provide a specified thermal output, as indicated.

FIGS. 4 and 5 illustrate the construction of the base 6 in further detail. As illustrated, the base 6 preferably includes an upper planar sheet 9 and a lower planar sheet 10 which are separated by a quantity of insulation material 11. The planar sheet 9, 10 and the insulation material 11 are preferably enclosed within a peripheral frame 12 comprised of four rectangular sides 13 and opposing flanges 14. A variety of materials may be used to construct the base 6 previously described. For example, suitable results have been obtained using a base 6 incorporating planar sheets 9, 10 formed of ½ inch plywood panels and approximately 2½ inches of suitable insulation materials such as plastic foams or fiberglass batts. The frame 12 may be formed of wood, such as redwood, to enhance its appearance, or if preferred, may be formed of a suitable metal. In either case, screws or other suitable attachment means may be used to secure the sheets 9, 10 in position within and between the flanges of the frame 12 as shown. Of course, other materials and assembly techniques may be used in accordance with the present invention. For example, in many applications it is advisable to use a silicone sealant to increase the resistance of the forgoing structure to moisture and to decrease losses of the heat transfer medium (particularly air) which is used in conjunction with the solar energy collection system 1. This is particularly advisable along the seams which join the several components previously described. Further protection may be achieved by applying various coatings to the exterior members of the base 6, such as zinc chrome, to protect against its deterioration. Other variations are also clearly possible.

The base 6 is provided with at least two apertures 15, 16 for use in distributing the heat transfer medium which is used in conjunction with the system. A first aperture 15 is provided for communication with the pre-heater 3. Since the pre-heater 3 extends longitudinally along one edge of the base 6, it is preferred that the aperture 15 also extend longitudinally through the base 6 (as best illustrated in FIG. 5) to achieve an optimum flow of the heat transfer medium. The second aperture 16 is provided as an outlet for the heat transfer medium which has been circulated through the solar collector 2.

As is best illustrated in FIG. 5, a plenum 17 is preferably positioned over the sheet 9 of the base 6 as well as the aperture 15 which communicates with the pre-heater 3. Since the aperture 15 preferably extends lonitudinally across the edge of the base 6 which is provided with the pre-heater 3, the plenum 17 also preferably extends longitudinally across the base 6, as shown, to completely cover the aperture 15. The plenum 17 is generally formed as an inverted pan having four sides 18 and a top 19. The periphery 20 of the plenum 17 preferably incorporates a flange 21 which is used to receive hardware for attaching the plenum 17 to the sheet 9 of the base 6 as shown. Such a plenum 17 may be formed of a variety of materials, including metals and plastics, depending upon the application involved. Preferably, the flange 21 of the plenum 17 would be provided with a silicone sealant to ensure that a sealed enclosure results.

The top 19 of the plenum 17 is further provided with an aperture 22 which permits communication between the plenum 17 and the interior of the solar collector 2. As shown, the aperture 22 is substantially centrally located along the center-most edge of the plenum 17 so that the aperture 22 is substantially centrally located over the base 6 of the solar collector 2. In this manner, the heat transfer medium which is received through the aperture 15 is redistributed through the plenum 17 for delivery to lower, central portions of the base 6 of the solar collector 2.

Figure 6:
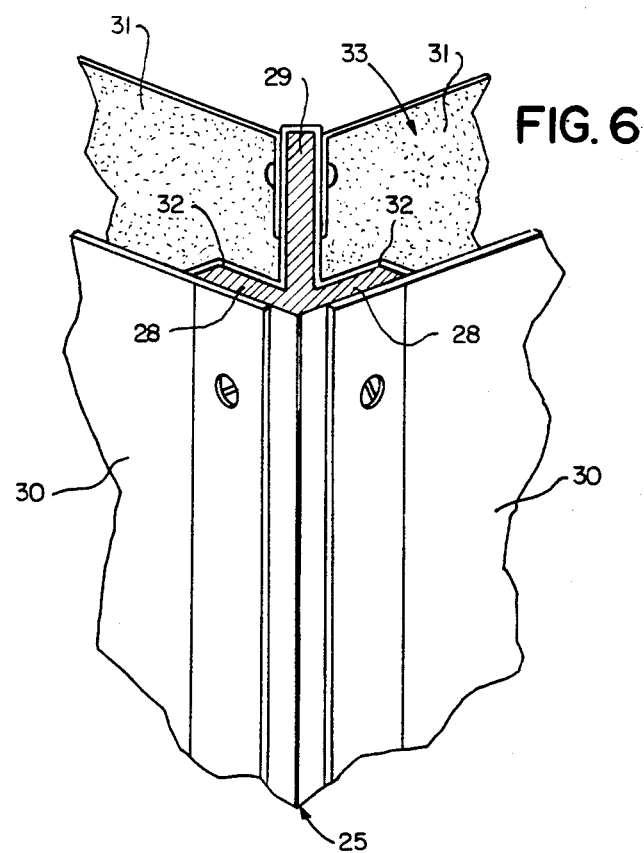
FIG. 6 is a partial, cross sectional view of the solar collector of FIG. 4, taken along line 6—6.
Figure 7:
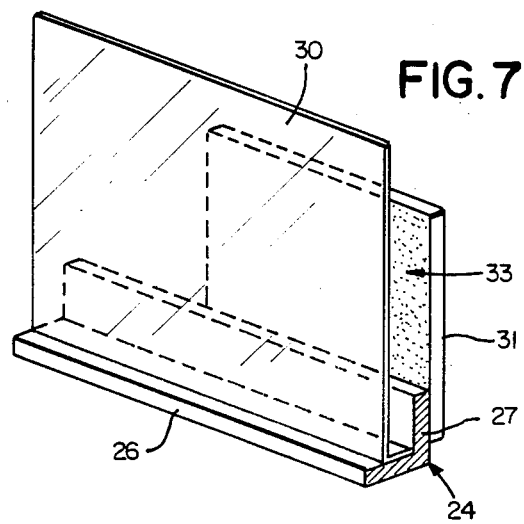
FIG. 7 is a partial, cross sectional view of the solar collector of FIG. 4, taken along line 7—7.

Extending upwardly from the base 6 is a framework 23 which is used to engage the sides 7 which form the faces of the solar collector 2. Referring to FIGS. 6 and 7, it may be seen that two different types of channels 24, 25 are used in assembling the framework 23.

FIG. 7 illustrates an L-shaped channel 24 which extends over and around the periphery of the planar sheet 9 as shown. The base 26 of the channel 24 is suitably attached to the planar sheet 9 of the base 6 using appropriate hardware, to secure the channels 24 in position. The channels 24 further include a leg portion 27 extending upwardly from the outermost edge of the base 26 for a purpose which will be more fully described below. FIG. 6 illustrates a second type of channel 25, which generally comprises a pair of essentially perpendicular leg portions 28 which are joined together along intersecting edges, and a rib 29 which essentially bisects the leg portions 28 and which extends inwardly from the joined edges of the leg portions 28 as shown. The channels 24, 25 may be formed of a variety of materials, however, the use of extruded aluminum is considered preferred. Intersections of the various channels 24, 25 comprising the framework 23 are preferably joined together as shown using appropriate adhesives, solder connections or welds.

The framework 23 defined by the channels 24, 25 previously described is then used to form the sides 7 of the solar collector 2 as follows. In its preferred embodiment, each side 7 of the solar collector 2 comprises an outer, clear panel 30 and an inner, opaque panel 31, as is best illustrated in FIGS. 6 and 7. The clear panels 30 are preferably formed of clear fiberglass or other suitable material, and the peripheral edges of each clear panel 30 are preferably attached to and between the leg portions 28 of the channels 25 and the leg portions 27 of the channels 24 using suitable attachment means, such as screws or rivets. Again, the application of a silicone sealant between the edges of the clear panels 30 and the channels 24, 25 is preferred to assure that a fully sealed enclosure results. The opaque panels 31 are preferably formed of aluminum or copper and are preferably provided with a flat or selective black finish. Each opaque panel 31 is spaced inwardly from its associated clear panel 30, and is attached to and between the ribs 29 of the channels 25 and the base 26 of the channels 24, again using appropriate attachment means. The interior face portions of the channels 24, 25 are preferably provided with a ceramic insulating paper 32 to provide additional insulation between the opaque panels 31 and the channels 24, 25 to which they are attached. As a result of the foregoing, an insulated air gap 33 is developed between the panels 30, 31 and the channels 24, 25. Such an air gap 33 is preferred to provide a means for insulating the interior of the solar collector 2 from its exterior, and an air gap of $\frac{3}{4}$ inch is preferred for this purpose.

As is best illustrated in FIGS. 3 and 4, the enclosure 34 defined by the base 6 and sides 7 contains a distribution assembly 35 which generally comprises a truncated, pyramid-shaped distributor 36 containing a centrally disposed duct system. The distributor 36 generally comprises a base 38 and four sides 39 which are correspondingly configured to the base 6 and sides 7 of the solr collector 2 as shown, and is symetrically positioned within the enclosure 34 and over the base 6 of the solar collector 2 using the mounting brackets 37 illustrated. Extending axially through the distributor 36 and communicating with the truncated opening of the distributor 36 is a duct 41. The duct 41 communicates, via offset duct portion 42, with an aperture 43 in the base 38, which in turn provides for direct communication between the aperture 43 and the opening 40. Further, a duct portion 45 extends between the aperture 43 of the base 38 of the distributor 36 and the aperture 16 of the base 6 of the solar collector 2.

In this manner, a heat transfer medium received through the aperture 15 of the base 6 of the solar collector 2 is permitted to enter the enclosure 34 defined by the solar collector 2, through the aperture 22 in the plenum 17. Thereafter, the heat transfer medium is caused to pass between the base 38 of the distributor 36 and the base 6 of the solar collector 2, as well as between the sides 7 of the solar collector 2 and the sides 39 of the distributor 36, whereupon solar radiation impinging upon the sides 7 of the solar collector 2 will cause the heat transfer medium to become heated. The heated transfer medium will then be collected via the opening 40 and the duct 41, 42, 45 for subsequent return to the remainder of the system through the aperture 16 in the base of the solar collector 2.

The distribution assembly 35 may be formed from a variety of materials. For example, suitable results have been obtained using a base 38 formed of $\frac{1}{8}$ inch plywood and sides 39 formed of $\frac{1}{2}$ inch plywood. The outer faces of the sides 39 are preferably covered with a foil material such as aluminum foil and the inner surfaces of the several components comprising the distributor 36 are preferably provided with the insulation materials shown. Further, the duct portions 41, 42, 45 are also preferably covered with a suitable insulation material, the insulation material extending around the duct portion 45 preferably being on the order of 3 inches in thickness. Of course, a variety of insulation materials may be used for this purpose, including plastic foams or fiberglass batts. It is preferred that all seams developed between the base 38, sides 39 and duct portions 41, 42, 45 be coated with a silicone sealant to fully seal the resulting structure and to prevent the possibility of insulation materials from escaping through such seams and subsequently being carrid through and out of the solar collector 2. It is also preferred that the insulation material which surrounds the duct portion 45 in turn be surrounded by a cover, as shown, to maintain the insulation material in position over the duct portion 45.

As previously mentioned, the pre-heater 3 is attached to and beneath the base 6 of the solar collector 2, as best illustrated in FIGS. 2 and 4. The pre-heater 3 generally comprises a hollow bodied enclosure having a back 46 and four sides 47, 48. The open top 49 of the enclosure is provided with a cover 50 as shown. In forming the pre-heater 3, the lateral sides 47 are preferably substantially perpendicular to the back 46, while the sides 48 which form the communicating end portions of the pre-heater 3 are preferably angled with respect to the back 46 to properly interface with the solar collector 2 and the remainder of the solar collection system 1.

Each of the sides 48 are provided with an aperture 51, 52 as shown. The aperture 52 is adapted for communication with the aperture 15 of the solar collector 2, and is preferably fitted with an interconnecting plenum 53 as shown. The aperture 51 provides an opening for communication with the remainder of the solar energy collection system 1, acting as an input for the heat transfer medium which is to be delivered to the solar collector 2.

Extending between the sides 47, 48 and located within the confines of the enclosure of the pre-heater 3 is an opaque panel 54 which serves as a means for absorbing solar radiation. In its preferred embodiment, the opaque panel 54 is substantially planar, including angled portions 55 at either end. Each of the angled portions 55 preferably terminate along the edge 56 of each of the apertures 51, 52 nearest the back 46. A quantity of insulation material is again preferably positioned between the opaque panel 54, back 46 and sides 47, 48, which may again be formed of either plastic foams or fiberglass batts. It is also possible to provide additional insulation material along inside surface portions of the sides 47, 48 located above the opaque panel 54, if desired.

In its preferred embodiment, the back 46 and sides 47, 48 are preferably formed of wood, while the cover 50 is preferably formed of a clear plastic material such as clear fiberglass. The opaque panel 54 is preferably formed of aluminum or copper and is preferably provided with a flat or selective black surface, similarly to the opaque panels 31 of the solar collector 2. An appropriate silicone sealent would again preferably be used to seal the various seams formed in constructing the pre-heater 3.

It will be understood that an appropriate heat transfer medium, such as air, may be delivered to the aperture 51 of the pre-heater 3 for subsequent delivery through the pre-heater 3 to the aperture 15 of the solar collector 2. Thereafter, the heat transfer medium will be collected from the aperture 16 of the solar collector 2 as previously described, for subsequent processing through the remainder of the solar energy collection system 1. During this process, solar radiation impinging upon the panel 54 of the pre-heater 3 as well as the panels 31 of the solar collector 2 will be converted into heat capable of being entrained by the heat transfer medium for subsequent delivery through the remainder of the solar energy collection system 1. It will be readily understood that the quantity of heat produced will depend upon the size and the relative positioning between the various components which comprise the solar collector 2 and pre-heater 3, and accordingly, that the configuration of these components may be varied in accordance with the present invention to develop a desired thermal output. In some cases, this will merely require altering the relative dimensions of the various components comprising the system. In other cases, this may require certain minor structural modifications to accommodate these differences in component size.

Although the solar collector 2 and pre-heater 3 previously described may be used independently to collect and transfer solar radiation in the form of heat to a heating system, it is preferred in accordance with the present invention that the solar collector 2 and pre-heater 3 be used in conjunction with the series of mirrors illustrated in FIG. 1, to further enhance the efficiency of the foregoing system.

Figure 8:
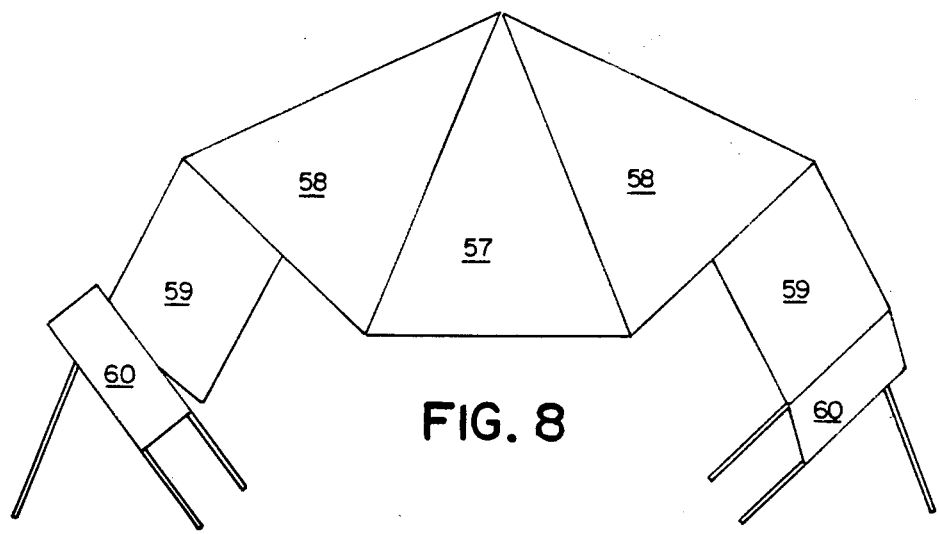
FIG. 8 is a perspective view of a first, lower series of mirrors which form part of the solar energy collection system of FIG. 1.

FIG. 8 illustrates a first series of mirrors 4 which primarily serve to amplify the amount of solar radiation which impinges upon the solar collector 2 and pre-heater 3, thereby increasing their thermal output. The series of mirrors 4 generally include three primary sections 57, 58 and two secondary sections 59, 60 as shown. As illustrated in FIG. 1, the solar collector 2 and pre-heater 3 are substantially centrally positioned within the arc-shaped segment defined by the series of the mirrors 4 so that the primary section 57 is located immediately behind the solar collector 2 and pre-heater 3, and so that the primary sections 58 are located adjacent opposing lateral edges of the primary section 57 as shown. The secondary sections 59, 60 are positioned outwardly from opposed lateral edges of the primary sections 58, completing the arc-shaped segment which is defined by the series of mirrors 4. In its preferred embodiment, each of the sections 57, 58, 59, 60 are formed of a mirrored material, preferably aluminized mylar, positioned on an appropriate substrate, as will be more fully described below. Each of the sections 57, 58, 59, 60 are located at an appropriate angular orientation which facilitates the collection and reflection of solar radiation toward the solar collector 2 and the pre-heater 3. Although preferred, it is not necessary for the section 57 to be mirrored since the section 57 is at least partially blocked by the solar collector 2 and pre-heater 3. In such case, although less desirable, the section 57 may be formed of a non-reflective substance which is preferably coated with silver paint or the like.

Further in this regard, the solar collector 2 and pre-heater 3 are preferably provided with additional mirrored surfaces 61, 62, as best illustrated in FIG. 1. As shown, a pair of mirrored surfaces 61 are positioned along opposed vertical edges of the front face of the solar collector 2, while a mirrored surface 62 is located along the base of the front face of the solar collector 2 and the pre-heater 3 respectively. Although, as previously, the mirrored surfaces 61, 62 may be formed of a variety of materials, sheets of aluminum have been found to provide adequate results. Again these mirrored surfaces 61, 62 are used to collect and amplify the amount of solar radiation which is delivered to the solar collector 2 and pre-heater 3, thereby increasing their thermal output.

FIG. 1 further illustrates a second series of mirrors 5 which primarily serve to compensate for movement of the sun during the day. This is accomplished by appropriately positioning the series of mirrors 5 so that incident solar radiation may be received for subsequent transfer to the solar collector 2 and pre-heater 3 irrespective of the position of the sun with respect to these components. In the embodiment illustrated, the series of mirrors 5 generally includes two rows 63, 64 of mirrors, the top row of mirrors 63 including thirteen mirrored surfaces 65, and the bottom row of mirrors 64 including twelve mirrored surfaces 65. Each of the mirrored surfaces 65 are placed in an orientation which will receive incident solar radiation during a particular portion of an operating day, and thereafter reflectively transmit this incident solar radiation to the solar collector 2 for subsequent collection and distribution. For example, during morning hours the mirrors 63, 64 located on the left side of the series 5 will cause incident solar radiation to be reflected in a generally downward sweep toward the solar collector 2 and pre-heater 3, while the solar collector 2 will directly receive incident solar radiation. During afternoon hours, the converse situation is presented, while during noon hours all of the mirrors 63, 64 will directly receive incident solar radiation for reflection toward the solar collector 2 and pre-heater 3. It will therefore be understood that the orientation of the various mirrored surfaces 65 comprising the rows 63, 64 may be varied as needed to achieve an optimized duty cycle for a particular geographic location, as will be more fully illustrated with reference to Example 1 below. Moreover, the number of mirrored surfaces 65 comprising the rows 63, 64, as well as the number of rows used in a particular application, may be varied as desired. In this manner, a duty cycle of significantly increased duration is provided.

Proper positioning of the various mirrors 57, 58, 59, 60, 61, 62, 63, 64 previously described may be accomplished in a variety of ways. For example, each of these compoents could be produced by providing a mirrored surface with a suitable backing, such as plywood, and using suitable framing components to position the component with respect to the solar collector 2 and pre-heater 3 in the desired manner. Alternatively, it is also possible to develop a unitary framing member for supporting the various mirrored surfaces in their correct orientation. For example, this could be accomplished by developing an arcuately shaped, unitary structure formed of any of a variety of materials including fiberglass, plastic foams, lightweight plastics, wood compositions, wood foams, etc. Such a unitary support member would significantly increase the simplicity of the system, since the respective positioning of the various components comprising the system would be predefined by the unitary structure formed.

EXAMPLE 1

The following illustrative example is provided to describe one embodiment of the solar energy collection system 1 illustrated in FIG. 1 which was constructed in accordance with the present invention.

The solar collector 2 constructed had a square base 6, each side measuring 24 inches in length, and vertical channels 25 having a length of 40 inches each. Since the heat transfer medium used was air, the solar collector 2 incorporated a distribution assembly 35 of the type illustrated in FIGS. 2–4. The base 38 of the distributor 36 was spaced 4 inches from the base 6 of the solar collector 2, and 2 inches from the sides 7 of the solar collector 2. The sides 39 of the distributor 36 were uniformly spaced 3 inches from the sides 7 of the solar collector 2. The size of the duct 41, 42, 45, as well as the opening 40, was 2 inches on each side. Regarding insulation, the base 38 of the distributor 36 was provided with 3 inches of insulation, the sides 39 of the distributor 36 were provided with 2 inches of insulation, and the duct portions 41, 42 were provided with 1 inch of insulation.

The pre-heater 3 constructed had a square back 46, each side measuring $20\frac{1}{2}$ inches in length. The open end of the pre-heater 3 enclosed by the cover 50 was also square, each side measuring 24 inches in length. The sides 47, 48 were correspondingly configured to develop this taper, the top side 47 forming a 101° angle with the back 46 and the bottom side 47 forming a 112° angle with the back 46. The cross-sectional planar length of the opaque panel 54 was $16\frac{3}{4}$ inches, and the panel 54 was placed within the pre-heater 3 so that $3\frac{1}{2}$ inches of insulation could be placed between the panel 54 and the back 46, and so that a 2 inch gap was developed between the panel 54 and the cover 50. The apertures 51, 52 were each centrally located along the sides 47, and each measured 2 inches in width and $16\frac{1}{2}$ inches in length, as did the apertures 15 of the solar collector 2.

Regarding the first series of mirrors 4, the primary section 57 was provided with a 38 inch base and $52\frac{1}{2}$ inch sides, while each primary section 58 was provided with a 43 inch base and $52\frac{1}{2}$ inch sides. Each secondary section 59 was square, having 2 foot sides, and each secondary section 60 was rectangular, having a 1 foot base and 2 foot sides. The following table (Table 1) describes the positioning of the sections 57, 58, 59, 60 with respect to the solar collector 2 by providing an indication of various distances between the sections 57, 58, 59, 60 and the base 6 of the solar collector 2 with regard to various reference numerals shown in FIG. 1.

TABLE 1

| From Position on Section | To Position on Solar Collector | Distance (inches) |
|---|---|---|
| 102 | 100 | $44\frac{1}{2}$ |
| 103 | 100 | $45\frac{1}{2}$ |
| 104 | 100 | $49\frac{3}{4}$ |
| 105 | 100 | $45\frac{1}{2}$ |
| 106 | 100 | $40\frac{3}{4}$ |

TABLE 1-continued

| From Position on Section | To Position on Solar Collector | Distance (inches) |
|---|---|---|
| 107 | 100 | 36 |
| 108 | 101 | 43 |
| 109 | 101 | $43\frac{3}{4}$ |
| 110 | 101 | $44\frac{1}{2}$ |
| 111 | 101 | 45 |
| 112 | 101 | $35\frac{1}{4}$ |
| 113 | 101 | 36 |

The solar collector 2 was positioned with respect to the series of mirrors 4 as follows. A first bracket having a length of 5 inches was connected between the pinnacle 8 of the solar collector 2 and the apex of the section 57. A second bracket having a length of $6\frac{1}{2}$ inches was connected to the base 6 of the solar collector 2 and normal to the face of the section 57, in turn developing a spacing of $14\frac{1}{2}$ inches between the left rear corner of the base 6 of the solar collector 2 and the left lower vertex of the section 57, and a third bracket having a length of $5\frac{1}{2}$ inches was connected to the base 6 of the solar collector 2 and normal to the face of the section 57, in turn developing a spacing of 13 inches between the right rear corner of the base 6 of the solar collector 2 and the right lower vertex of the section 57, respectively. Since the sections 57, 58, 59 are joined along their respective lateral edges, the foregoing parameters will combine to define the arc-shaped segment developed by the series of mirrors 4 used in the test embodiment.

Regarding the second series of mirrors 5, each of the mirrored surfaces 65 were square, measuring 1 foot on each side, and the following table (Table 2) describes the positioning of each mirrored surface with respect to the solar collector 2. In this table the first column (1) indicates the mirrored surface being described, with reference to FIG. 1 of the drawings; the second through the fifth columns (2–5) indicate the distance in inches between the nearest lower front corner of the solar collector 2 and the upper left corner, upper right corner, lower left corner and lower right corner, respectively of each mirrored surface (unless indicated otherwise); the sixth column (6) indicates the vertical pitch in degrees of each mirrored surface; and the seventh column (7) indicates the horizontal tilt in degrees of each mirrored surface.

TABLE 2

| 1 | 2 | 3 | 4 | 5 | 6* | 7** |
|---|---|---|---|---|---|---|
| 120 | $47\frac{3}{4}$ | $48\frac{3}{4}$ | 42 | 43 | $-21\frac{1}{2}$ | $+1$ |
| 121 | 48 | $47\frac{1}{2}$ | $42\frac{1}{2}$ | $41\frac{1}{2}$ | $-16\frac{1}{2}$ | $+2\frac{1}{2}$ |
| 122 | — | $43\frac{3}{4}$ | $40\frac{3}{4}$ | 41 | $+11$ | $+33\frac{1}{2}$ |
| 123 | $30\frac{1}{4}$(T) | $40\frac{1}{4}$ | $28\frac{1}{4}$(T) | $33\frac{3}{4}$ | $+6\frac{1}{2}$ | $+32$ |
| 124 | $38\frac{1}{2}$ | 41 | 35 | $38\frac{1}{2}$ | $+25$ | $-28\frac{1}{2}$ |
| 125 | $43\frac{1}{4}$ | 43 | 41 | 40 | $+24\frac{1}{2}$ | $-31$ |
| 126 | $51\frac{1}{2}$ | $64\frac{1}{4}$(T) | 46 | 63(T) | $-23$ | $-12$ |
| 127 | $50\frac{1}{4}$ | $52\frac{3}{4}$ | $44\frac{1}{2}$ | 55(T) | $-20$ | $-9$ |
| 128 | $44\frac{3}{4}$ | $46\frac{1}{2}$ | 40 | 42 | $+3$ | $-35$ |
| 129 | $42\frac{1}{2}$ | 46 | $37\frac{1}{2}$ | $41\frac{1}{2}$ | $+1$ | $-29$ |
| 130 | $41\frac{1}{4}$ | 47 | $36\frac{1}{2}$ | 43 | $+6$ | $-19$ |
| 131 | 44 | $11\frac{1}{4}$(T) | $40\frac{1}{2}$ | $6\frac{1}{4}$(T) | $+14$ | $-11$ |
| 132 | $57\frac{1}{2}$ | $53\frac{1}{2}$ | $53\frac{1}{2}$ | 49 | $+2$ | $-12$ |
| 133 | $56\frac{1}{4}$ | 55 | $49\frac{1}{2}$ | 48 | $-2$ | $+9\frac{1}{2}$ |
| 134 | $51\frac{1}{2}$ | 50 | 46 | $44\frac{3}{4}$ | $+18$ | $+28\frac{1}{2}$ |
| 135 | $50\frac{1}{4}$ | $48\frac{1}{2}$ | 45 | 43 | $+20$ | $+19\frac{1}{2}$ |
| 136 | 49 | 46 | $42\frac{3}{4}$ | $39\frac{1}{4}$ | $+60\frac{1}{2}$ | $+12$ |
| 137 | 54 | $51\frac{3}{4}$ | 47 | $44\frac{3}{4}$ | $+16$ | $+7$ |
| 138 | $59\frac{1}{2}$ | $56\frac{1}{2}$ | $52\frac{1}{2}$ | $49\frac{1}{4}$ | $-21$ | $-15$ |
| 139 | $56\frac{1}{2}$ | $52\frac{1}{2}$ | $52\frac{1}{4}$ | $48\frac{1}{4}$ | 0 | $-4\frac{1}{2}$ |
| 140 | 56 | $57\frac{1}{2}$ | $49\frac{3}{4}$ | $51\frac{3}{4}$ | $+3\frac{1}{2}$ | $-22$ |

TABLE 2-continued

| 1 | 2 | 3 | 4 | 5 | 6* | 7** |
|---|---|---|---|---|---|---|
| 141 | 55½ | 55 | 48¾ | 47¾ | +9 | −12½ |
| 142 | 49¾ | 49¼ | 42½ | 42 | +10½ | −10 |
| 143 | 51¼ | 50¾ | 44¼ | 43¾ | +22½ | −4½ |
| 144 | 55 | 57 | 48¼ | 50¼ | +15 | −4 |

*Positive numbers indicate a forward pitch; negative numbers indicate a backward pitch.
**Positive numbers indicate a clockwise rotation; negative numbers indicate counterclockwise rotation.
(T) Indicates measurements taken to the top (pinnacle 8) of the solar collector rather than the base.

Lastly, each of the mirrored surfaces 61 measured 4 inches in width and 38 inches in length, while each mirrored surface 62 measured 1 foot in width and 2 feet in length. The left mirrored surface 61 was located at an angle of 102° with respect to the front face of the solar collector 2, while the right mirrored surface 61 was located at an angle of 105° with respect to the front face of the solar collector 2. The upper mirrored surface 62 was located at an angle of 138° with respect to the front face of the solar collector 2, while the lower mirrored surface 62 was located at an angle of 108° with respect to the cover 50 of the pre-heater 3.

The foregoing embodiment was located in Cape May County, N.J. (39° latitude). Placement of the solar energy collection system 1 was accomplished by causing the front face of the solar collector 2 to assume an angle which is 10½° plus the degree of latitude at which the unit is placed (in the present Example, this angle was 49½°), and with the front face being set between true south and up to 6° west of true south (in the present Example, the front face was placed ½° west of true south). In operation, upon exposure to either direct or diffused sunlight, the foregoing solar energy collection system achieved significant temperatures and thermal outputs, achieving temperatures in excess of 300° F. (static conditions—on clear days) even in the months of January and February.

It will therefore be understood that the foregoing structure serves well to satisfy each of the objectives previously set forth. It will also be understood that the foregoing structure is capable of variation without departing from the spirit and scope of the present invention.

For example, in the foregoing description, the solar collector 2 and pre-heater 3 are described for use in conjunction with a heat transfer medium such as air, which is readily circulated through the various ducts and chambers shown. However, it is to be understood that the present invention is also capable of use in conjunction with a fluid-type heat transfer medium such as water or oil. To do so, it is necessary to vary portions of the solar collector 2 and pre-heater 3 to accommodate such fluids. One manner in which this may be accomplished is illustrated in FIGS. 9 and 10 of the drawings, which show an alternative embodiment solar collector 70 capable of receiving a fluid-type heat transfer medium.

As illustrated in FIG. 9, the solar collector 70 includes a base 71 and sides 72 which are similar in peripheral appearance to the base 6 and sides 7 of the solar collector 2 illustrated in FIGS. 1–8. However, in the present embodiment, the plenum 17, the distribution assembly 35 and the apertures 15, 16 have been eliminated from the base 17, and the sides 72 are now formed of an opaque material such as aluminum or copper, the exterior face portions of which are provided with a suitable surface such as a flat or selective black finish, similar to the panels 31 of the solar collector 2. As a result, solar radiation impinging upon the sides 72 of the solar collector 70 serves to heat the sides 72, as well as the enclosure 73 defined by the sides 72 and base 71, for purposes which will be more fully described below. If desired, the solar collector 70 could also be used in conjunction with a pre-heater as previously described. Of course, in such case the pre-heater would be provided with suitable fluid carrying devices capable of cooperating with the remainder of the solar energy collection system used.

To collect the heat developed by the solar collector 70, an appropriate fluid circulation system is provided which generally comprises an inlet manifold 74, a series of distributors 75, and an outlet manifold 76. The inlet manifold 74 incorporates two sections 77a, 77b which are capable of receiving fluid from the fluid inlet 78. One section 77a communicates between one of the lateral distributors 75 and the section 77b, while the remaining section 77b communicates between the opposing lateral distributor 75 and the front distributor 75.

Each of the distributors 75 generally comprise an inlet tube 79, an outlet tube 80, and a series of capillary tubes 81 extending between the tubes 79, 80. One end of the inlet tube 79 is provided with a fitting 82 for attachment to the sections 77a, 77b as previously described. The outlet tube 80 is also provided with a fitting 83 for attachment to the outlet manifold 76, as will be more fully described below. The capillary tubes 81 preferably extend between the manifolds 79, 80 in regular, converging fashion as shown to achieve the uniform transfer of heat to the fluid medium being conveyed within the system. Although five capillary tubes 81 are shown in the illustrative example, it is to be understood that any number of capillary tubes may be provided, and that this number would generally correspondingly increase with the size of the solar collector 70 being used. Moreover, although the converging pattern illustrated is preferred, it is to be understood that other patterns may be developed for use with the present invention.

The outlet manifold 76 extends axially through the base 71 and enclosure 73 to a position near the pinnacle 8 of the solar collector 70. The upper end of the outlet manifold 76 is provided with a coupler 84 for communication with the distributors 75. As shown, a four-way coupler 84 is preferably provided to receive the fluid outlet 85 and three distributors 75, since the back of the solar collector 70 will generally not receive solar radiation and therefore need not be provided with a distributor 75. Of course, if preferred, additional distributors 75 may be provided to achieve additional heat absorption, in which case other suitable couplers would be used, as would other arrangements of the sections 77.

It will be understood that the terminating ends of the fluid inlet 78 and fluid outlet 85 will be attached to the remainder of the solar energy collection system for subsequent processing. As with the solar collector 2, it will be understood that the solar collector 70 may also be varied in size to suit a particular application and to provide a desired thermal output. In the preferred embodiment, the inlet manifold 74, distributors 75 and outlet manifold 76 would preferably be formed of copper tubing, although other materials could be used if preferred, and the various elements comprising the distributors 75 would preferably be provided with a flat or selective black finish to increase heat absorption of the system.

Although in most cases it will only be necessary to provide a solar collection system 1 which utilizes either an air-type heat absorbing medium, or a fluid-type heat absorbing medium, it is also possible for the present invention to combine such media by providing the solar collector 70 illustrated in FIGS. 9 and 10 with internally disposed air distribution equipment of the type illustrated in FIGS. 1–8. In such case, care must be taken to assure that the air distribution equipment does not interfere with the inlet manifold 74 and outlet manifold 76. In this manner, both the air-type and fluid-type collector systems would separately operate as previously described. Similar considerations would apply with regard to the use of a pre-heater 3, if desired.

It will therefore be understood that various changes in the details, materials and arrangements of parts which have been herein described and illustrated in order to explain the nature of this invention may be made by those skilled in the art within the principle and scope of the invention as expressed in the following claims.

What is claimed is:

1. A solar collector comprising:
   (a) a pyramid-shaped enclosure including an insulated base and four triangular sides attached to and between the base and each other;
   (b) a pair of communicating apertures extending through the base and into central portions of the enclosure;
   (c) means for receiving solar radiation and for converting received solar radiation into heat, operatively associated with the sides of the enclosure; and
   (d) distribution means, operatively associated with the enclosure and including means for routing air as a heat transfer medium between the communicating apertures of the base of the enclosure and the solar radiation receiving means whereby solar radiation is transferred, in the form of heat, to the air routed therethrough, said distribution means including a distribution assembly located within the central portions of the enclosure and comprising:
       (i) a base including a communicating aperture therethrough, and four essentially triangular sides attached to and between the base of the distribution assembly and each other, wherein the exterior surfaces of said sides are provided with a reflective coating; and
       (ii) duct means extending through central portions of the distribution assembly and communicating between the aperture of the base and an opening provided at the pinnacle of the distribution assembly;
   wherein the base and sides of the distribution assembly are spaced from the base and sides of the enclosure of the solar collector so that the air received from a first one of the apertures of the base of the enclosure is passed between the distribution assembly and the enclosure of the solar collector and received through the opening in the pinnacle of the distribution assembly for delivery via the duct means to the aperture of the distribution assembly.

2. The solar collector of claim 1 further comprising communicating duct means attached to and between the aperture of the distribution assembly and a second one of the apertures of the enclosure.

3. The solar collector of claim 1 wherein at least portions of the interior surfaces of the distribution assembly are provided with an insulation material.

* * * * *